(12) United States Patent
Liu

(10) Patent No.: US 9,837,840 B2
(45) Date of Patent: Dec. 5, 2017

(54) ELECTRONIC CIGARETTE CHARGING APPARATUS

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 0 days.

(21) Appl. No.: 15/021,750

(22) PCT Filed: Sep. 12, 2013

(86) PCT No.: PCT/CN2013/083412
§ 371 (c)(1),
(2) Date: Mar. 14, 2016

(87) PCT Pub. No.: WO2015/035592
PCT Pub. Date: Mar. 19, 2015

(65) Prior Publication Data
US 2016/0233708 A1    Aug. 11, 2016

(51) Int. Cl.
*H01R 13/641*    (2006.01)
*H02J 7/00*    (2006.01)
(Continued)

(52) U.S. Cl.
CPC .......... *H02J 7/0047* (2013.01); *A24F 47/008* (2013.01); *H01M 2/105* (2013.01);
(Continued)

(58) Field of Classification Search
CPC ...... A24F 47/008; A24F 47/002; A24F 47/00; H01R 13/641; H01R 13/2421; H01R 13/2428
(Continued)

(56) References Cited

U.S. PATENT DOCUMENTS 4,496,213 A * 1/1985 Borsuk ................ G02B 6/3825
385/59
5,167,528 A * 12/1992 Nishiyama ............. H01R 23/27
29/883
(Continued)

FOREIGN PATENT DOCUMENTS

CN    202122096 U    1/2012
CN    202534729 U    11/2012

OTHER PUBLICATIONS

International Search Report of PCT Patent Application No. PCT/CN2013/083412 dated Jun. 30, 2014.

*Primary Examiner* — Gary Paumen

(57) ABSTRACT

An electronic cigarette charging apparatus is used for charging a battery component (1) of an electronic cigarette. A first electrode connecting piece and a second electrode connecting piece used for being electrically connected to the electronic cigarette charging apparatus are disposed at an end of the battery component (1). The electronic cigarette charging apparatus comprises a first charging electrode (5) that corresponds to the first electrode connecting piece and may extend and contract, and a collision sound-making mechanism (6) disposed on an extension and contraction path of the first charging electrode (5). During charging, the first charging electrode (5) elastically contracts along the extension and contraction path to a predetermined position, and the first charging electrode (5) and the first electrode connecting piece are electrically connected. The first charging
(Continued)

electrode (5) triggers the collision sound-making mechanism (6) to make an engaging prompt sound.

16 Claims, 7 Drawing Sheets

(51) Int. Cl.
    *A24F 47/00*     (2006.01)
    *H01M 10/46*     (2006.01)
    *H01M 2/10*     (2006.01)
    *H01R 13/24*     (2006.01)
    *H01M 10/42*     (2006.01)

(52) U.S. Cl.
    CPC .......... *H01M 10/46* (2013.01); *H02J 7/0042* (2013.01); *H02J 7/0044* (2013.01); *H01M 10/42* (2013.01); *H01M 2220/30* (2013.01); *H01R 13/2421* (2013.01); *H01R 13/641* (2013.01)

(58) Field of Classification Search
    USPC ................................. 439/489, 488, 700, 824
    See application file for complete search history.

(56) References Cited

U.S. PATENT DOCUMENTS

| | | | | |
|---|---|---|---|---|
| 6,457,991 | B1* | 10/2002 | Yu ..................... | H01R 13/641 439/489 |
| 6,471,539 | B1* | 10/2002 | Yu ..................... | H01R 13/641 439/489 |
| 7,445,492 | B2* | 11/2008 | Hiramatsu ......... | H01R 13/6272 439/489 |
| 2005/0112935 | A1* | 5/2005 | Nimura ................ | H01R 13/641 439/489 |
| 2007/0038334 | A1* | 2/2007 | Chou .................. | H01R 25/003 700/292 |
| 2008/0032545 | A1* | 2/2008 | Lutsch ............... | H01R 13/6272 439/489 |
| 2010/0105238 | A1* | 4/2010 | Good .................. | H01R 13/639 439/357 |
| 2011/0189880 | A1* | 8/2011 | Bondo ................. | H01R 13/26 439/345 |
| 2015/0059784 | A1* | 3/2015 | Liu ..................... | A24F 47/008 131/329 |

\* cited by examiner

ELECTRONIC CIGARETTE CHARGING APPARATUS

TECHNICAL FIELD

The present application relates to the technical field of electronic products, and more particularly, relates to an electronic cigarette charging apparatus.

BACKGROUND

Electronic cigarettes are used for smoking cessation and substitute for traditional cigarettes. An electronic cigarette available in the market comprises a battery rod and an atomizer. When a smoking action is taking place, a battery in the battery rod supplies power to the atomizer, driving heating wires to emit heat, and thus tobacco tar is atomized and smoke is further produced as a result. The electronic cigarette is an electronic product which consumes a lot of current for only an instant. Due to the limitation of the battery capacity of the electronic cigarette, a user can continue to use the electronic cigarette only after the battery is charged. However, when an existing charging apparatus of the electronic cigarette is charging the battery component, only an indicator light on the bottom will indicate that whether the battery component is plugged in place. In this case, it is inconvenient for the user to estimate whether the battery component is plugged in place during the charging process thereof, which brings a lot of inconvenience to the user.

BRIEF SUMMARY

The objective of the present application is to provide an electronic cigarette charging apparatus, which facilitates the user to estimate whether the battery component is plugged in place during the charging process of thereof, aiming at the drawbacks in the prior art that, it is inconvenient to estimate whether the battery component is plugged in place during the charging process.

In accordance with one aspect of the present application, an electronic cigarette charging apparatus is provided, which is used for charging a battery component of an electronic cigarette, a first electrode connecting piece and a second electrode connecting piece used for electrically connected to the electronic cigarette charging apparatus and disposed at an end of the battery component; wherein the electronic cigarette charging apparatus comprises a first charging electrode and a collision sound-making mechanism; the first charging electrode is arranged correspondingly to the first electrode connecting piece and is telescopic; the collision sound-making mechanism is disposed on an extension and contraction path of the first charging electrode; during a charging process, the first charging electrode is elastically contracted along the extension and contraction path to a predetermined position, and the first charging electrode is electrically connected to the first electrode connecting piece; the first charging electrode triggers the collision sound-making mechanism to make an in-place prompt sound.

In the electronic cigarette charging apparatus of the present application, wherein the electronic cigarette charging apparatus further comprises a mounting base; the first charging electrode is telescopically mounted on the mounting base; the collision sound-making mechanism is mounted in the mounting base, and is further disposed along the extension and contraction path of the first charging electrode.

In the electronic cigarette charging apparatus of the present application, the collision sound-making mechanism includes an impacting elastic element; wherein the impacting elastic element includes a fixing portion which is fixedly connected to the mounting base, and a free portion which extends from the fixing portion in a direction towards the first charging electrode; the free portion is used for colliding with the first charging electrode and further making an in-place prompt sound, when the first charging electrode is telescopically deformed to move from an initial position to the predetermined position.

In the electronic cigarette charging apparatus of the present application, the first charging electrode includes an electrode column and an elastic element; a first flange and a second flange are separately arranged on the electrode column in an axial direction of the electrode column; when the free portion is located at the first flange, the first charging electrode is located in the initial position; while the free portion is located at the second flange, the first charging electrode is located in the predetermined position.

In the electronic cigarette charging apparatus of the present application, the collision sound-making mechanism further includes a sound-making element fixing base; the impacting elastic element is fixedly connected to the mounting base via the sound-making element fixing base.

In the electronic cigarette charging apparatus of the present application, the sound-making element fixing base is integrated with the mounting base.

In the electronic cigarette charging apparatus of the present application, the collision sound-making mechanism further includes a sliding block, an impacting elastic element, and an elastically abutting element; wherein the sliding block is slidably connected to the mounting base, and one end of the sliding block is disposed on the extension and contraction path; the impacting elastic element is used for colliding with the sliding block when the sliding block is sliding, and for further making an in-place prompt sound; the elastically abutting element is abutted against the other end of the sliding block, and is used for providing an elastic force to the sliding block.

In the electronic cigarette charging apparatus of the present application, the impacting elastic element includes a fixing portion which is fixedly connected to the mounting base, and a free portion which extends from the fixing portion in a direction towards the sliding block; the free portion is used for colliding with the sliding block and further making an in-place prompt sound, when the first charging electrode is telescopically deformed to move from an initial position to the predetermined position.

In the electronic cigarette charging apparatus of the present application, the sliding block includes a first projection and a second projection which are parallel to each other and separated from each other; when the free portion is located at the first projection, the first charging electrode is located in the initial position; when the free portion is located at the second projection, the first charging electrode is located in the predetermined position.

In the electronic cigarette charging apparatus of the present application, the first charging electrode includes an electrode column and an elastic element; a column sleeve portion is formed on the electrode column; the column sleeve portion is abutted against the sliding block, and pushes the sliding block to move in a direction away from the first charging electrode.

In the electronic cigarette charging apparatus of the present application, the collision sound-making mechanism further includes a sliding seat; the sliding block is slidably connected to the mounting base via the sliding seat.

In the electronic cigarette charging apparatus of the present application, the sliding seat is integrated with the mounting base.

In the electronic cigarette charging apparatus of the present application, the impacting elastic element is a sound-making elastic sheet which is arranged in a direction parallel to the first charging electrode.

In the electronic cigarette charging apparatus of the present application, the impacting elastic element is a sound-making elastic sheet which is arranged in a direction perpendicular to the first charging electrode.

In the electronic cigarette charging apparatus of the present application, the electronic cigarette charging apparatus further includes a first elastic sheet and a second elastic sheet which are fixedly connected to the mounting base; the first elastic sheet and the second elastic sheet together form an elastic sheet switch which is used for triggering the charging process of the electronic cigarette charging apparatus; the first charging electrode is sleeved in the first elastic sheet; when the elastic sheet switch is closed, the first charging electrode is located in the predetermined position.

In the electronic cigarette charging apparatus of the present application, the electronic cigarette charging apparatus is a cigarette case of the electronic cigarette.

When implementing the electronic cigarette charging apparatus of the present application, the following advantageous can be achieved: by adding a collision sound-making mechanism corresponding to the charging electrode in the charging apparatus of the electronic cigarette, and the battery component of the electronic cigarette pushes the charging electrode to telescopically move when the battery component is plugged into the charging apparatus, it is possible for the charging electrode to trigger the collision sound-making mechanism to make an in-place prompt sound in order to prompt that the battery component is plugged in place. In this way, it is convenient for the user to estimate whether the battery component is plugged in place during the charging process of the battery component when using the sound to prompt the user, and thus the user experience is improved as a result.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

An electronic cigarette charging apparatus provided in the present application is used for charging a battery component of an electronic cigarette. And the electronic cigarette charging apparatus in the present application is in particular an apparatus which is capable of prompting a user whether the electronic cigarette is plugged in place during the charging process.

Figure 1:
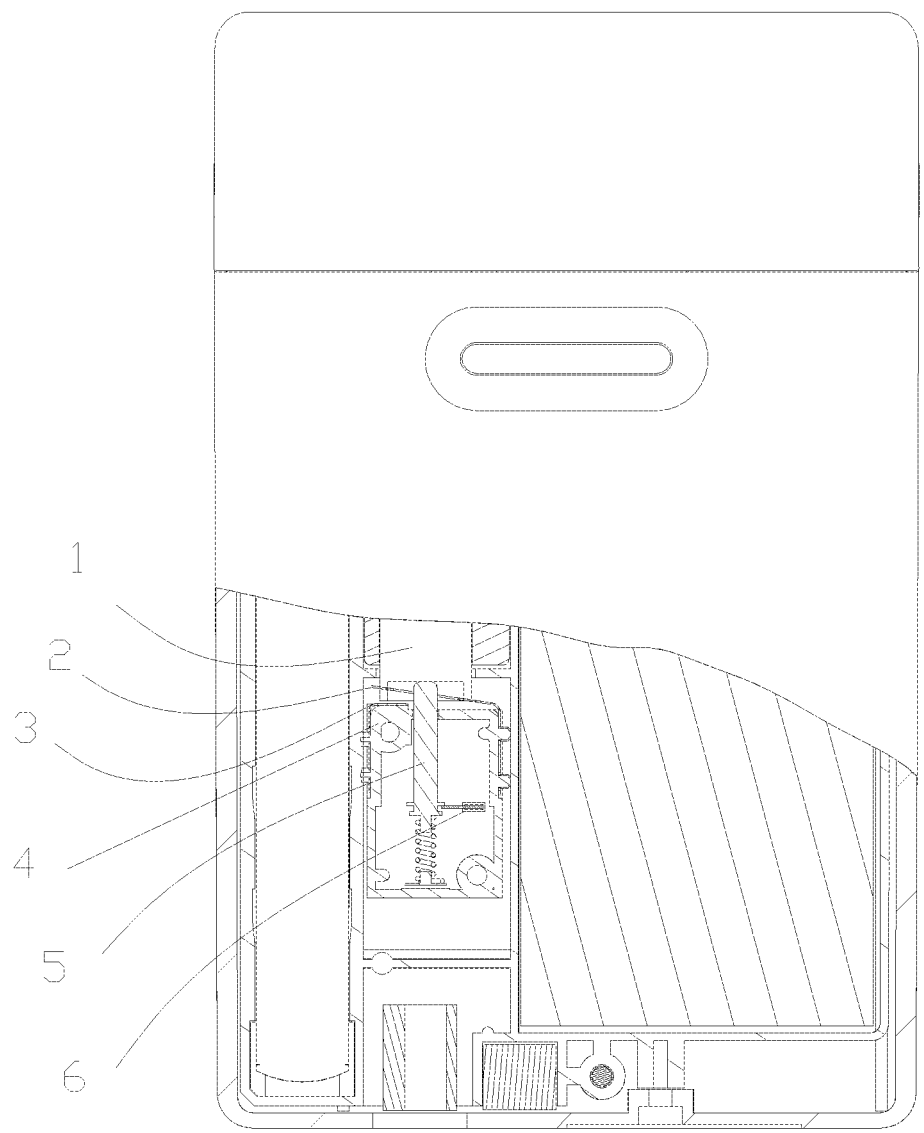
FIG. 1 is a partially cutaway view of an electronic cigarette charging apparatus provided in the present application.

As shown in FIG. 1, in a preferred embodiment of the present application, the electronic cigarette charging apparatus is a cigarette case of the electronic cigarette, which is not only used for holding the electronic cigarette, but also used for charging a battery component 1 of the electronic cigarette. A first electrode connecting piece and a second electrode connecting piece (not labeled in figures) used for being electrically connected to the electronic cigarette charging apparatus are disposed at an end of the battery component 1.

The electronic cigarette charging apparatus comprises a charging socket (not labeled). In this case, the charging socket includes a mounting base 4, a first charging electrode 5, a first elastic sheet 2, a second elastic sheet 3, and a collision sound-making mechanism 6. The first charging electrode 5 is arranged correspondingly to the first electrode connecting piece, telescopically mounted on the mounting base 4, and further partially received in the mounting base 4. The first elastic sheet 2 and the second elastic sheet 3 are fixedly connected to two opposite sides of the mounting base 4 respectively, and the first elastic sheet 2 and the second elastic sheet 3 together form an elastic sheet switch used for triggering the electronic cigarette charging apparatus to charge the battery component. The first charging electrode 5 is sleeved in the first elastic sheet. The collision sound-making mechanism 6 is fixedly mounted in the mounting base 4, and is further disposed on an extension and contraction path of the first charging electrode 5. At the beginning of the charging, the battery component 1 is plugged into the electronic cigarette charging apparatus; due to the gravity of the electronic cigarette, the first elastic sheet 2 is pushed to be attached to the second elastic sheet 3 in such a way that the elastic sheet switch is closed, and the first charging electrode 5 is electrically connected to the first electrode connecting piece; meanwhile, the first charging electrode 5 is pushed to elastically contracted to a predetermined position along the extension and contraction path, thus the first charging electrode 5 triggers the collision sound-making mechanism 6 to make an in-place prompt sound, in order to prompt the user that the battery component 1 is plugged in place. In this embodiment, the predetermined position is a position in which the first charging electrode 5 located after being elastically contracted, when the battery component 1 is plugged in place in the charging apparatus during the charging process; that is, it is a position in which the first charging electrode 5 located when the elastic sheet switch is closed.

Figure 2:
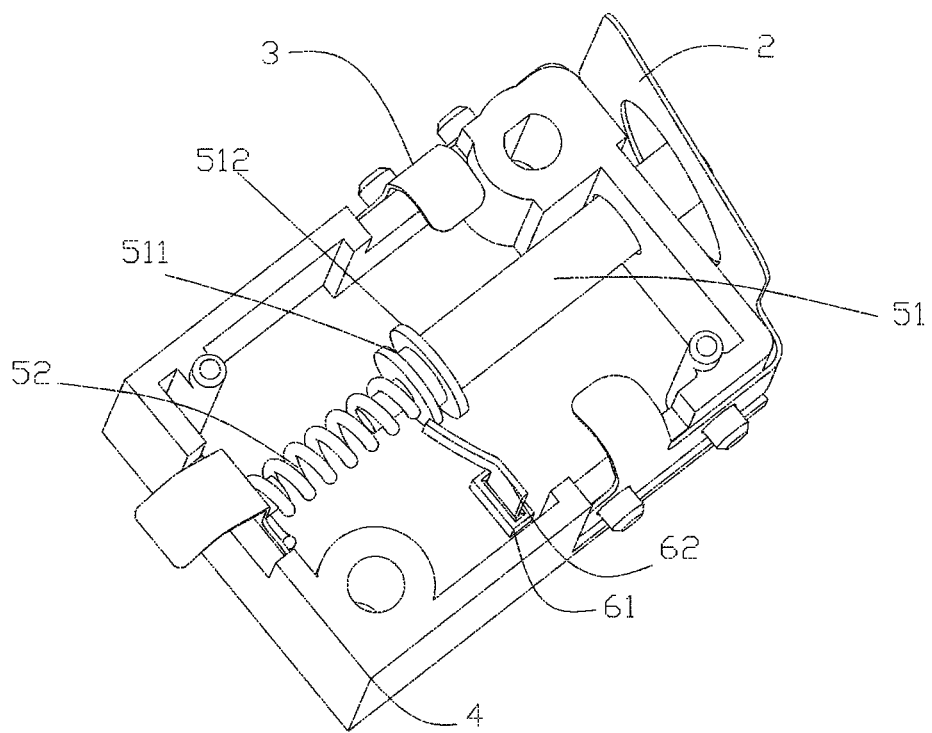
FIG. 2 is a schematic view of a charging socket according to a first embodiment of the electronic cigarette charging apparatus provided in the present application.

FIG. 2 shows an electronic cigarette charging apparatus according to a first embodiment. In this case, the electronic cigarette charging apparatus includes a charging socket, wherein the charging socket includes a mounting base 4, a first charging electrode 5, a first elastic sheet 2, a second elastic sheet 3, and a collision sound-making mechanism 6. The first charging electrode 5 is arranged correspondingly to the first electrode connecting piece, telescopically mounted on the mounting base 4, and further partially received in the mounting base 4. The first elastic sheet 2 and the second elastic sheet 3 are fixedly connected to two opposite sides of the mounting base 4 respectively, and the first elastic sheet 2 and the second elastic sheet 3 together form an elastic sheet switch used for triggering the electronic cigarette charging apparatus to charge. The first charging electrode 5 is sleeved in the first elastic sheet. The collision sound-making mechanism 6 is fixedly mounted in the mounting base 4, and is further disposed on an extension and contraction path of the first charging electrode 5.

Figure 3:
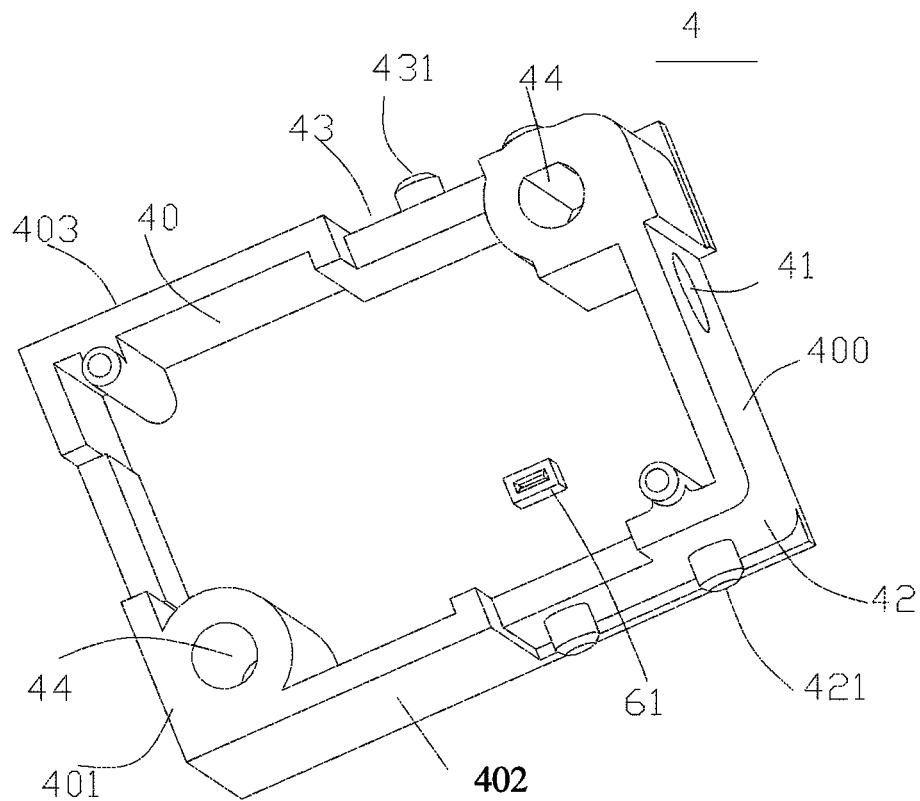
FIG. 3 is a schematic view of a mounting base shown in FIG. 2.

In this embodiment, referring to FIG. 3 and combing with FIGS. 1-2, the mounting base 4 includes a main body 40, a first through hole 41, a first elastic sheet mounting recess 42, a second elastic sheet mounting recess 43, and a connection hole 44. In this case, the main body 40 is substantially in shape of a hollow cuboid. A receiving cavity (not labeled) used for receiving the first charging electrode 5 is formed in the main body 40, and an external surface of the main body includes a first end face 400 which is close to the electronic cigarette, a first side wall 402 which is adjacent to the first end face 400, and a second side wall 403 which is opposite to the first side wall 402. The external surface of the main body 40 further includes a second end face 401, and the connection hole 44 used for connecting an PCB board (not shown in figures) is further defined on the second end face 401.

The first through hole 41 is defined on the first end face 400 of the main body 40. In this case, the first through hole 41 is communicated with the receiving cavity, and is a hole which is in shape of a cylinder and which is adapted to the first charging electrode 5. The first charging electrode 5 runs through the main body 40 and further elastically and telescopically inserted into the first through hole 41.

The first elastic sheet mounting recess 42 is defined on the first side wall 402 of the main body, and at least one first buckle 421 is arranged on the first elastic sheet mounting recess 42. It is possible for a cross-section of the first buckle 421 to be in shape of a circle, a polygon, or the like. When a plurality of first buckles 421 are provided, the plurality of first buckles 421 are separately arranged on the first elastic sheet mounting recess 42, and the first elastic sheet 2 is buckled to the main body 40 via the first buckle 421.

The second elastic sheet mounting recess 43 is defined on the second side wall 403 of the main body, and at least one second buckle 431 is arranged on the second elastic sheet mounting recess 43. It is possible for a cross-section of the second buckle 431 to be in shape of a circle, a polygon, or the like. When a plurality of second buckles 431 are provided, the plurality of second buckles 431 are separately arranged on the second elastic sheet mounting recess 43, and the second elastic sheet 3 is buckled to the main body 40 via the second buckle 431.

In addition, the electronic cigarette charging apparatus further includes a PCB board (not labeled). A charging circuit is provided on the PCB board, and is further fixed on the mounting base 4 via a fastener. The connection hole 44 on the mounting base 4 is cooperated with the fastener in such a way that the PCB board longitudinally runs through the receiving cavity and is further fixed onto the second end face 401. The PCB board is electrically connected to the first elastic sheet 2, the second elastic sheet 3 and one end of the charging electrode 5. The charging circuit in the present application belongs to the prior art, and will not be described in detail any more.

Figure 4:
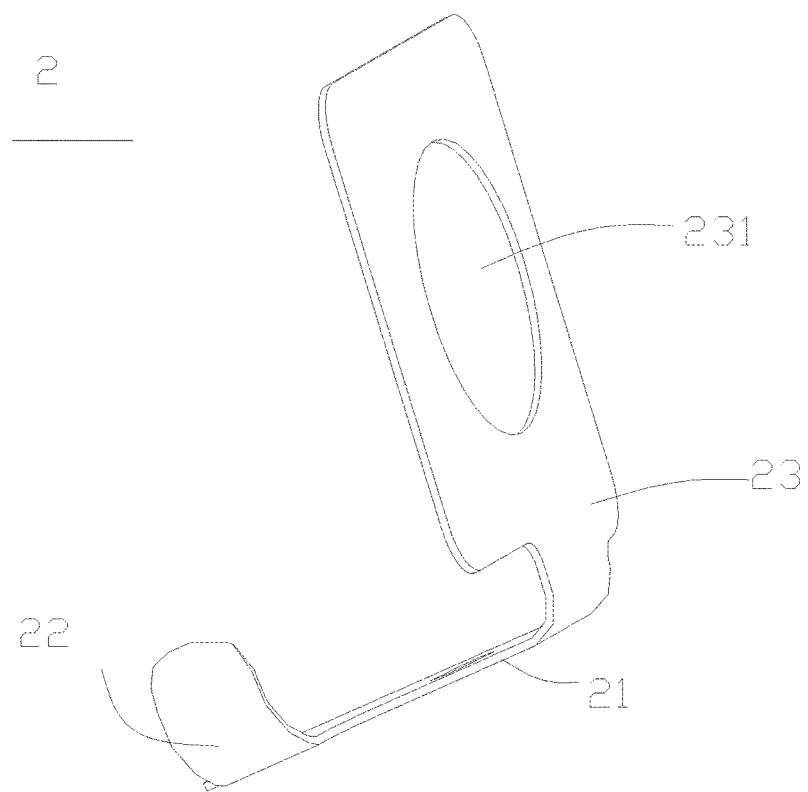
FIG. 4 is a schematic view of a first elastic sheet shown in FIG. 2.

As shown in FIG. 4, the first elastic sheet 2 includes a first connection portion 21, a first abutting portion 22 which is bent and projected from one end of the first connection portion 21 in a direction towards the PCB board, and a second charging electrode 23 which is bent from the other end of the first connection portion 21 in a direction towards the first end face 400. The first abutting portion 22 is abutted against and further elastically contacted with the PCB board to form an electrical connection.

At least one first buckling hole is separately arranged on the first connection portion 21, and the first buckling hole and the first buckle 421 of the first elastic sheet mounting recess 42 are adapted to each other. It is possible for a cross-section of the first buckling hole to be in shape of a circle, a polygon, or the like. The first elastic sheet 2 is buckled into the first elastic sheet mounting recess 42 via the first buckling hole.

The second charging electrode 23 is substantially a sheet structure. One end of the second charging electrode 23 that is connected to the first connection portion 21 is a fixed end, and the other end of the second charging electrode 23 that is opposite to the end connected to the first connection portion 21 is a free end. In a natural state, the free end is cocked upwardly, and the second charging electrode 23 takes the fixed end as a fulcrum, and the second charging electrode 23 is arranged at an angle from the first connection portion 21, and the angle is larger than 90 degrees.

In addition, a second through hole 231 used for the first charging electrode 5 to run through is further defined in the second charging electrode 23. The second charging electrode 23 is sleeved on the first charging electrode 5 via the second through hole 231, and the second through hole 231 is separated from a periphery of the first charging electrode 5, in such a way that the first charging electrode 5 is electrically insulated from the second charging electrode 23. In this case, it is possible for a cross-section of the second through hole 231 to be in shape of a circle, a polygon, or the like.

Figure 5:
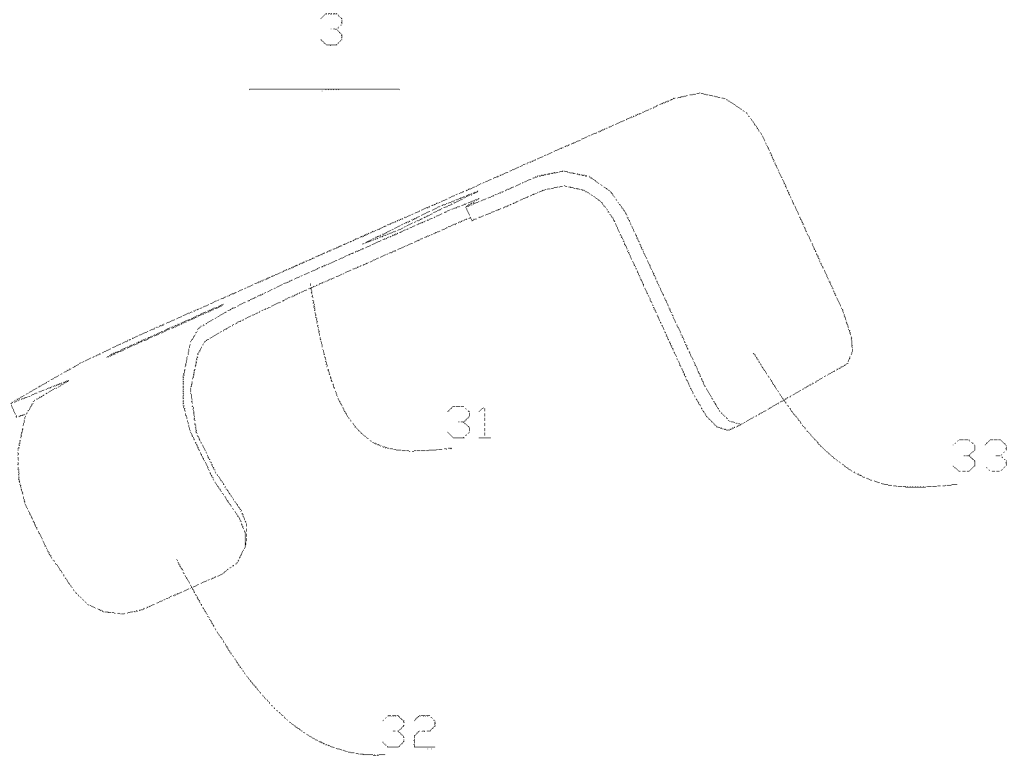
FIG. 5 is a schematic view of a second elastic sheet shown in FIG. 2.

As shown in FIG. 5, the second elastic sheet 3 is substantially a sheet structure. The second elastic sheet 3 includes a second connection portion 31, a second abutting portion 32 which is bent and projected from one end of the second connection portion 31 in a direction towards the PCB board, and a contact electrode 33 which is bent from the other end of the second connection portion 31 in a direction towards the first end face 400. The second abutting portion 32 is abutted against and further elastically contacted with the PCB board to form an electrical connection, while the contact electrode 33 is attached to the first end face 400 of the main body 40.

At least one second buckling hole is separately arranged on the second connection portion 31, and the second buckling hole and the second buckle 431 of the second elastic sheet mounting recess 43 are adapted to each other. It is possible for a cross-section of the second buckling hole to be in shape of a circle, a polygon, or the like. The second elastic sheet 3 is buckled into the second elastic sheet mounting recess 43 via the second buckling hole.

Figure 6:
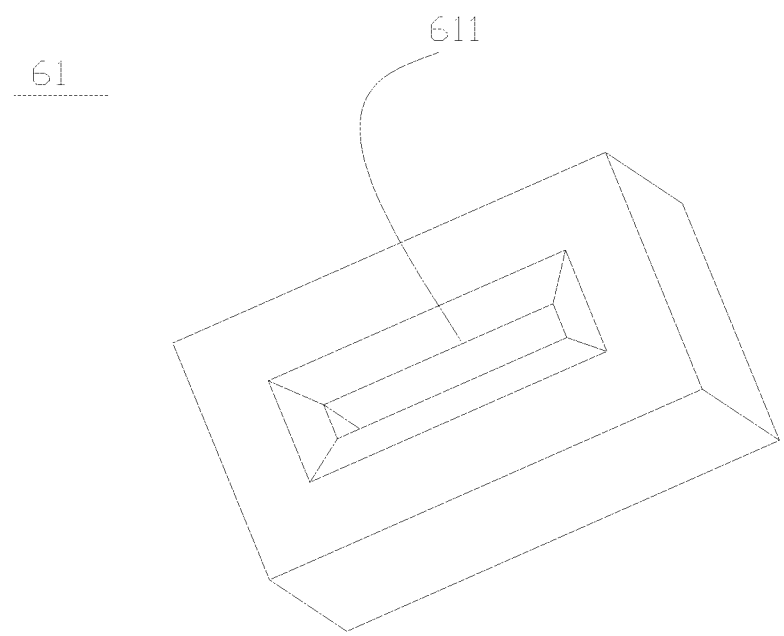
FIG. 6 is a schematic view of a sound-making element fixing base shown in FIG. 2.
Figure 7:
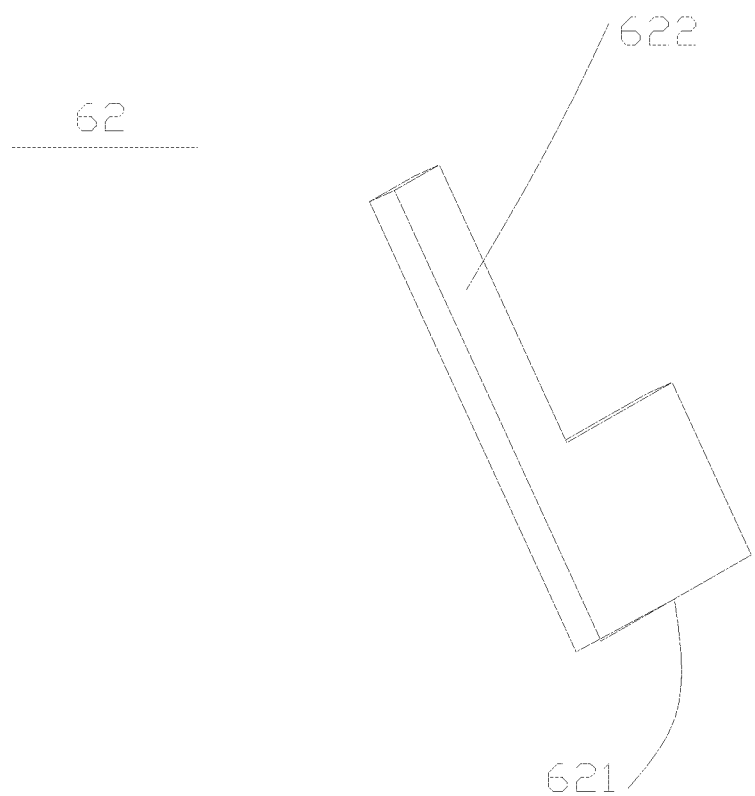
FIG. 7 is a schematic view of an impacting elastic element shown in FIG. 2.
Figure 8:
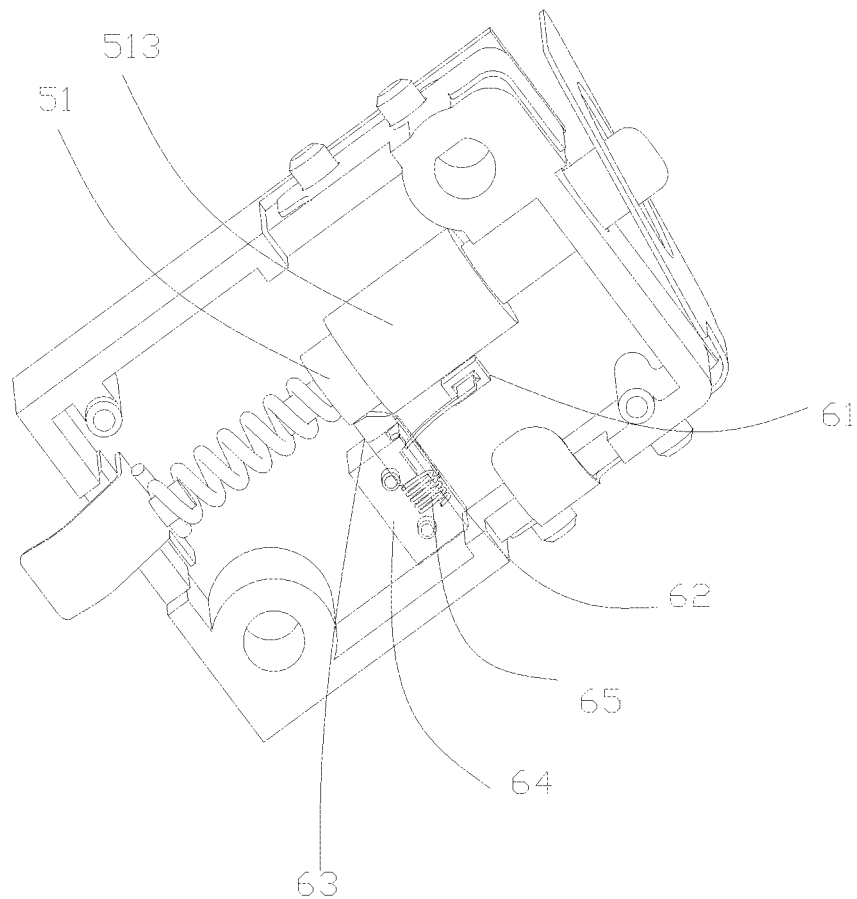
FIG. 8 is a schematic view of a charging socket according to a second embodiment of the electronic cigarette charging apparatus provided in the present application.
Figure 9:
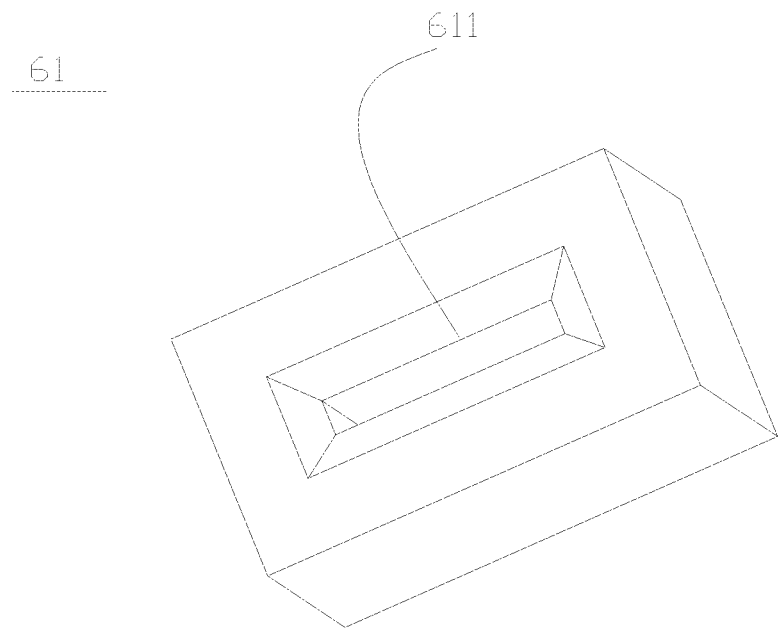
FIG. 9 is a schematic view of a sound-making element fixing base shown in FIG. 8.
Figure 10:
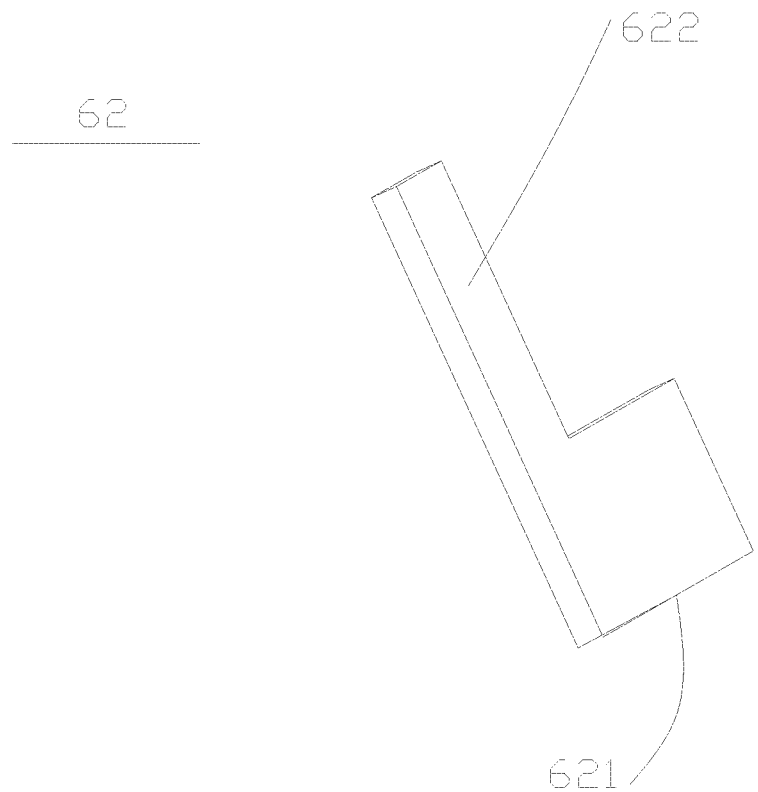
FIG. 10 is a schematic view of an impacting elastic element shown in FIG. 8.
Figure 11:
FIG. 11 is a schematic view of a sliding block shown in FIG. 8.
Figure 12:
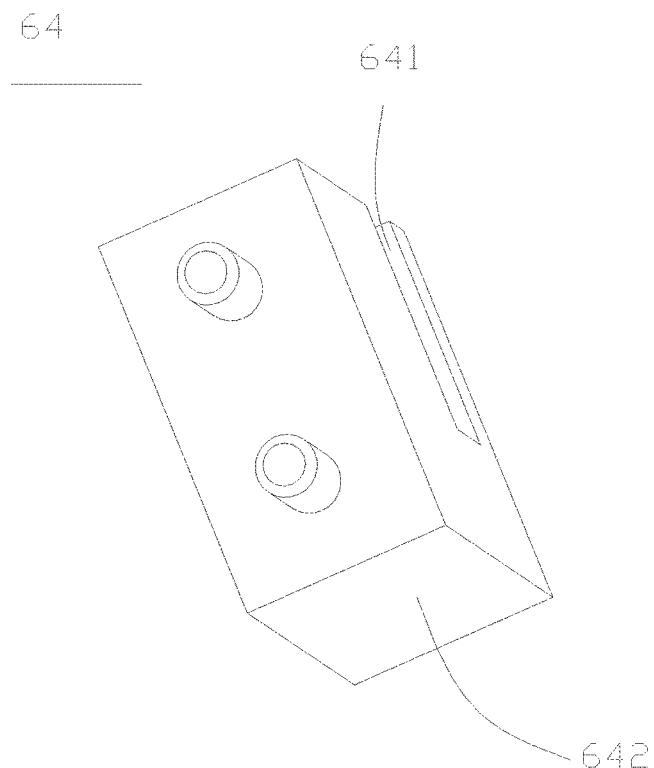
FIG. 12 is a schematic view of a sliding base shown in FIG. 8.
Figure 13:
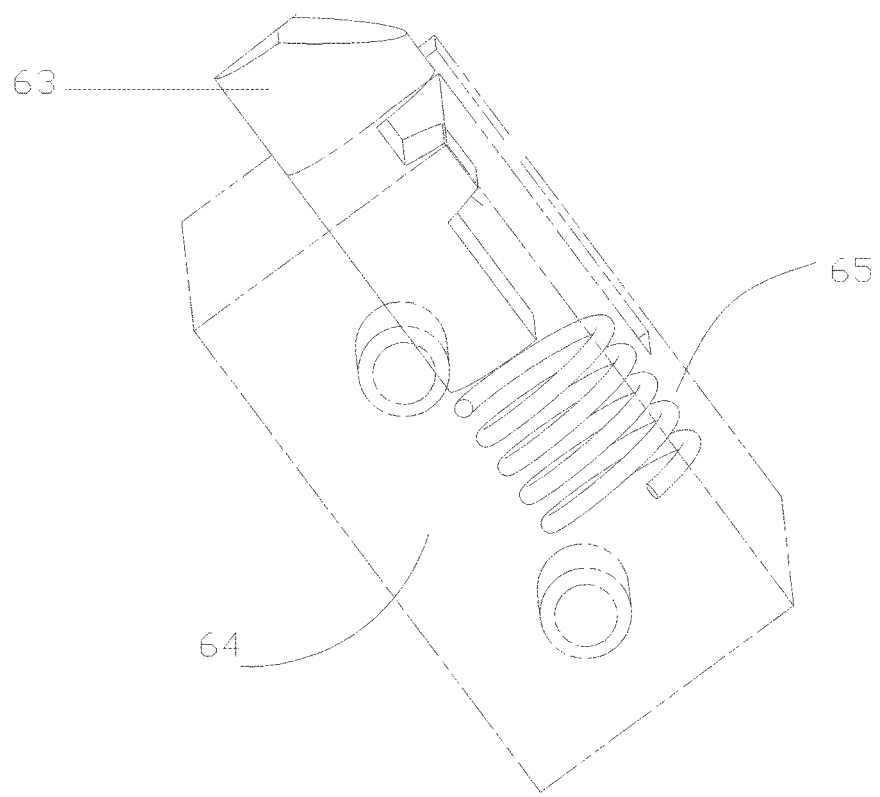
FIG. 13 is an assembled view of the sliding block, the sliding base, and the elastically abutting element shown in FIG. 8.

As shown in FIG. 6 and FIG. 7, and combing with FIG. 2, the first charging electrode 5 includes an electrode column 51 and an elastic element 52. One end of the electrode 51 is abutted against and contacted with the second electrode connecting piece of the battery component 1, while the other end of the electrode 51 is connected to the elastic element 52 such as by means of riveting. The electrode column 51 is in shape of a column, and the electrode column 51 is abutted against and contacted with the second electrode connecting piece by means of surface contact. In this way, the contact area between the electrode column 51 and the second electrode connecting piece of the electronic cigarette is increased, which improves the stability of the charging process of the electronic cigarette charging apparatus. In this embodiment, the elastic element 52 is a spring. Certainly, in other embodiments, it is also possible for the elastic element to be other kinds of component which provides an elastic force. One end of the spring is connected to the electrode column 51, and the other end of the spring is abutted against an inner side wall of the main body 40 that is opposite to the first end face 400. When the elastic sheet switch is opened, the electrode column 51 partially extends out of the main body 40; while the elastic sheet switch is closed, the electrode column 51 is pressed and contracted to the predetermined position. In this embodiment, a first flange 511 and a second flange 512 are respectively formed on the electrode column 51 of the first charging electrode 5 in an axial direction of the electrode column.

The collision sound-making mechanism 6 includes a sound-making element fixing base 61 and an impacting elastic element 62. In this case, the sound-making element fixing base 61 is fixedly mounted in the cavity of the mounting base 4 such as by means of welding or adhering, and is further arranged on the extension and contraction path of the first charging electrode 5. In this embodiment, the sound-making element fixing base 61 is preferably integrated with the mounting base 4. A mounting hole 611 used for holding the impacting elastic element 62 is defined in the sound-making element fixing base 61. Certainly, in other embodiments, it is also possible to directly fix the impacting elastic element 62 into the cavity of the mounting base 4, instead of providing the sound-making element fixing base 61. In this embodiment, the impacting elastic element 62 is a sound-making elastic sheet; however, in other embodiments, it is also possible for the impacting elastic element 62 to be other component which makes sound after being impacted. The impacting elastic element 62 includes a fixing portion 621 which is fixed in the mounting hole 611 of the sound-making element fixing base 61, and a free portion 622 which extends from the fixing portion 621 in a direction towards the first charging electrode 5. When the first charging electrode 5 is telescopically deformed to move from an initial position to the predetermined position, the free portion 622 is collided with the first charging electrode 5 and further makes an in-place prompt sound. In this embodiment, when the free portion 622 is located at the first flange 511, that is, when the first charging electrode 5 is in an extension state, the first charging electrode 5 is located in the initial position. However, when the free portion 622 is located at the second flange 512, that is, when the first charging electrode 5 is in a contraction state, the first charging electrode 5 is located in the predetermined position.

The working principle of the electronic cigarette charging apparatus provided in the first embodiment is further described detailed in the following.

At the beginning of the charging, the battery component 1 is plugged into the charging socket of the electronic cigarette charging apparatus. Due to the gravity of the electronic cigarette, the first charging electrode 5 which is abutted against the second electrode connecting piece is pushed to contract downwardly, and the second charging electrode 23 is pushed to move towards the contact electrode 33. When the second charging electrode 23 is attached to the contact electrode 33, the first charging electrode 5 is contracted to the predetermined position. During the contraction of the first charging electrode 5, the first charging electrode 5 is collided with the free portion 622 of the impacting elastic element 62 of the collision sound-making mechanism 6, thereby making an in-place prompt sound. The specific processes are as follow: during the contraction of the first charging electrode 5, firstly the free portion 622 is contacted with the first flange 511, and the first charging electrode 5 is located in the initial position at this time; with the first charging electrode 5 being further contracted downwardly, the first flange 511 further moves downwardly to push the free portion 622 and make the free end 622 to elastically deform; when the free portion 622 reaches to a deformation limit, the free portion 622 is restored and sprung upwardly, leaped over the first flange 511 and further collided with the second flange 512, thus making an in-place prompt sound, such as a sound produced due to the collision. At this time, the first charging electrode 5 is located in the predetermined position, which means the battery component 1 is plugged in place.

FIGS. 8-13 show an electronic cigarette charging apparatus according to a second preferred embodiment of the present application. The differences between the second embodiment and the first embodiment only lie in that, the structures of the first charging electrode 5 and the collision sound-making mechanism 6 in the charging socket are different. The structures of the other components and the connections therebetween are the same with the first embodiment.

In this embodiment, the collision sound-making mechanism 6 includes a sound-making element fixing base 61, an impacting elastic element 62, a sliding block 63, a sliding seat 64, and an elastically abutting element 65.

In this case, the sound-making element fixing base 61 is fixedly mounted in the cavity of the mounting base 4 such as by means of welding or adhering, and is further arranged on the extension and contraction path of the first charging electrode 5. In this embodiment, the sound-making element fixing base 61 is preferably integrated with the mounting base 40. A mounting hole 611 used for holding the impacting elastic element 62 is defined in the sound-making element fixing base 61. Certainly, in other embodiments, it is also possible to directly fix the impacting elastic element 62 into the cavity of the mounting base 4, instead of providing the sound-making element fixing base 61.

In this embodiment, the impacting elastic element 62 is a sound-making elastic sheet; however, in other embodiments, it is also possible for the impacting elastic element 62 to be other component which makes sound after being impacted. The impacting elastic element 62 includes a fixing portion 621 which is fixed in the mounting hole 611 of the sound-making element fixing base 61, and a free portion 622 which extends from the fixing portion 621 in a direction towards the sliding block 63. When the first charging electrode 5 is telescopically deformed to move from an initial position to the predetermined position, the free portion 622 is collided with the sliding block 63 and further makes an in-place prompt sound.

The sliding seat 64 is arranged in the cavity of the mounting base 4, and extends in a direction perpendicular to an extension direction of the free portion 622. The sliding seat 64 is substantially in shape of a cuboid, and a distance between the sliding seat 64 and the sound-making element fixing base 61 is less than or equivalent to the a length of the free portion 622. A sliding slot 641 used for the sliding block 63 to slide along is further defined in the sliding seat 64, and a close end 642 used for sealing the end of the sliding seat 64 is further provided in the sliding seat 64.

The sliding block 63 is slidably mounted in the sliding slot 641 of the sliding seat 64. In this case, one end of the sliding block 63 is disposed on the extension and contraction path of the first charging electrode 5, and is further abutted against the first charging electrode 5. The other end of the sliding block 63 is abutted against the elastically abutting element 65. A first projection 631 and a second projection 632 are separately arranged on the sliding block 63 and are parallel to each other. When the free portion 622 is located at the first projection 631, the first charging electrode 5 is located in the initial position; however, when the free portion 622 is located at the second projection 632, the first charging electrode 5 is located in the predetermined position.

The elastically abutting element 65 is preferably a spring. One end of the elastically abutting element 65 is abutted against the sliding block 63, and the other end of the elastically abutting element 65 is abutted against the close end 642 of the sliding seat. The elastically abutting element 65 is used for providing an elastic force for the sliding of the sliding block 63, and further driving the sliding block 63 to return.

In this embodiment, the first charging electrode 5 also includes an electrode column 51 and an elastic element 52. One end of the electrode 51 is abutted against and contacted with the second electrode connecting piece of the battery component 1, while the other end of the electrode 51 is connected to the elastic element 52 such as by means of riveting. The electrode column 51 is in shape of a column, and the electrode column 51 is abutted against and contacted with the second electrode connecting piece by means of surface contact. In this way, the contact area between the electrode column 51 and the second electrode connecting piece of the electronic cigarette is increased, which improves the stability of the charging process of the electronic cigarette charging apparatus. In this embodiment, the elastic element 52 is a spring. One end of the spring is connected to the electrode column 51, and the other end of the spring is abutted against an inner side wall of the main body 40 that is opposite to the first end face 400. When the elastic sheet switch is opened, the electrode column 51 partially extends out of the main body 40; while the elastic sheet switch is closed, the electrode column 51 is pressed and contracted to the predetermined position. In this embodiment, a column sleeve portion 513 is formed on the electrode column 51 of the first charging electrode 5 in an axial direction of the electrode column. In this case, a diameter of the column sleeve portion 513 is larger than a diameter of the electrode column 51, and the column sleeve portion 513 and other parts of the electrode column 51 form a stepped structure. Preferably, the diameter of the column sleeve portion 51 is gradually increased in a direction away from the elastic element 52, and thus it is convenient to push the sliding block 63 to steadily move in a direction away from the first charging electrode 5. The column portion 513 is used for pushing the sliding block 63 to move in a direction away from the first charging electrode 5, in such a way that the sliding block 63 is contacted with the free portion 622 of the impacting elastic element 62, collided with the free portion 622, and thereby making an in-place prompt sound.

The working principle of the electronic cigarette charging apparatus provided in the second embodiment is further described detailed in the following.

At the beginning of the charging, the battery component 1 is plugged into the charging socket of the electronic cigarette charging apparatus. Due to the gravity of the electronic cigarette, the first charging electrode 5 which is abutted against the second electrode connecting piece of the battery component 1 is pushed to contract downwardly, and the second charging electrode 23 is pushed to move towards the contact electrode 33. When the second charging electrode 23 is attached to the contact electrode 33, the first charging electrode 5 is contracted to the predetermined position. During the contraction of the first charging electrode 5, the first charging electrode 5 is collided with the collision sound-making mechanism 6, thereby making an in-place prompt sound. The specific processes are as follow: during the contraction of the first charging electrode 5, the column sleeve portion 513 of the electrode column 51 pushes the sliding block 63 which is abutted against the column sleeve portion 513 to move in a direction away from the first charging electrode 5. In this case, firstly, the first projection 631 of the sliding block 63 is contacted with the free end 622 of the impacting elastic element 62, and the first charging electrode 5 is located in the initial position at this time; with the first charging electrode 5 being further contracted downwardly, the sliding block 63 further moves in a direction away from the first charging electrode 5, in such a way that the free portion 622 is pushed to be elastically deformed; when being pushed further, the free portion 622 reaches to a deformation limit; at this time, the free portion 622 is restored and sprung forwardly, leaped over the first projection 631 and further reaches to the second projection 632, and the free portion 622 is finally collided with the second projection 632, thus making an in-place prompt sound, such as a sound produced due to the collision. At this time, the first charging electrode 5 is located in the predetermined position, which means the battery component 1 is plugged in place.

It should be understood that, in the inspiration of the present application, those skilled in the art may make many modifications or alternatives, without going beyond the purpose and the scope the claims intend to protect of the present application. All these belong to the protection of the present application.

The invention claimed is:

1. An electronic cigarette charging apparatus, used for charging a battery component (1) of an electronic cigarette, a first electrode connecting piece and a second electrode connecting piece used for being electrically connected to the electronic cigarette charging apparatus and disposed at an end of the battery component (1);

wherein the electronic cigarette charging apparatus comprises a first charging electrode (5) and a collision sound-making mechanism (6); the first charging electrode (5) is arranged correspondingly to the first electrode connecting piece and is telescopic; the collision sound-making mechanism (6) is disposed on an extension and contraction path of the first charging electrode (5);

during a charging process, the first charging electrode (5) is elastically contracted along the extension and contraction path to a predetermined position, and the first charging electrode (5) is electrically connected to the first electrode connecting piece; the first charging electrode (5) triggers the collision sound-making mechanism (6) to make an in-place prompt sound.

2. The electronic cigarette charging apparatus according to claim 1, wherein the electronic cigarette charging apparatus further comprises a mounting base (4); the first charging electrode (5) is telescopically mounted on the mounting base (4); the collision sound-making mechanism (6) is mounted in the mounting base (4), and is further disposed along the extension and contraction path of the first charging electrode (5).

3. The electronic cigarette charging apparatus according to claim 2, wherein the collision sound-making mechanism (6) includes an impacting elastic element (62); wherein the impacting elastic element (62) includes a fixing portion (621) which is fixedly connected to the mounting base (4), and a free portion (622) which extends from the fixing portion (621) in a direction towards the first charging electrode (5); the free portion (622) is used for colliding with the first charging electrode (5) and further making an in-place prompt sound, when the first charging electrode (5) is telescopically deformed to move from an initial position to the predetermined position.

4. The electronic cigarette charging apparatus according to claim 3, wherein the first charging electrode (5) includes an electrode column (51) and an elastic element (52); a first flange (511) and a second flange (512) are separately arranged on the electrode column (51) in an axial direction of the electrode column (51); when the free portion (622) is located at the first flange (511), the first charging electrode (5) is located in the initial position; while the free portion (622) is located at the second flange (512), the first charging electrode (5) is located in the predetermined position.

5. The electronic cigarette charging apparatus according to claim 4, wherein the collision sound-making mechanism (6) further includes a sound-making element fixing base (61); the impacting elastic element (62) is fixedly connected to the mounting base (4) via the sound-making element fixing base (61).

6. The electronic cigarette charging apparatus according to claim 5, wherein the sound-making element fixing base (61) is integrated with the mounting base (4).

7. The electronic cigarette charging apparatus according to claim 2, wherein the collision sound-making mechanism (6) further includes a sliding block (63), an impacting elastic element (62), and an elastically abutting element (65);
wherein the sliding block (63) is slidably connected to the mounting base (4), and one end of the sliding block (63) is disposed on the extension and contraction path;
the impacting elastic element (62) is used for colliding with the sliding block (63) when the sliding block (63) is sliding, and for further making an in-place prompt sound;
the elastically abutting element (65) is abutted against the other end of the sliding block (63), and is used for providing an elastic force to the sliding block.

8. The electronic cigarette charging apparatus according to claim 7, wherein the impacting elastic element (62) includes a fixing portion (621) which is fixedly connected to the mounting base (4), and a free portion (622) which extends from the fixing portion (621) in a direction towards the sliding block (63); the free portion (622) is used for colliding with the sliding block (63) and further making an in-place prompt sound, when the first charging electrode (5) is telescopically deformed to move from an initial position to the predetermined position.

9. The electronic cigarette charging apparatus according to claim 8, wherein the sliding block (63) includes a first projection (631) and a second projection (632) which are parallel to each other and separated from each other;
when the free portion (622) is located at the first projection (631), the first charging electrode (5) is located in the initial position; when the free portion (622) is located at the second projection (632), the first charging electrode (5) is located in the predetermined position.

10. The electronic cigarette charging apparatus according to claim 9, wherein the first charging electrode (5) includes an electrode column (51) and an elastic element (52); a column sleeve portion (513) is formed on the electrode column (51); the column sleeve portion (513) is abutted against the sliding block (63), and pushes the sliding block (63) to move in a direction away from the first charging electrode (5).

11. The electronic cigarette charging apparatus according to claim 10, wherein the collision sound-making mechanism (6) further includes a sliding seat (64); the sliding block (63) is slidably connected to the mounting base (4) via the sliding seat (64).

12. The electronic cigarette charging apparatus according to claim 11, wherein the sliding seat (64) is integrated with the mounting base (4).

13. The electronic cigarette charging apparatus according to claim 7, wherein the impacting elastic element (62) is a sound-making elastic sheet which is arranged in a direction parallel to the first charging electrode (5).

14. The electronic cigarette charging apparatus according to claim 3, wherein the impacting elastic element (62) is a sound-making elastic sheet which is arranged in a direction perpendicular to the first charging electrode (5).

15. The electronic cigarette charging apparatus according to claim 2, wherein the electronic cigarette charging apparatus further includes a first elastic sheet (2) and a second elastic sheet (3) which are fixedly connected to the mounting base (4); the first elastic sheet (2) and the second elastic sheet (3) together form an elastic sheet switch which is used for triggering the charging process of the electronic cigarette charging apparatus; the first charging electrode (5) is sleeved in the first elastic sheet (2); when the elastic sheet switch is closed, the first charging electrode (5) is located in the predetermined position.

16. The electronic cigarette charging apparatus according to claim 1, wherein the electronic cigarette charging apparatus is a cigarette case of the electronic cigarette.

* * * * *